Patented Dec. 10, 1929

1,738,659

UNITED STATES PATENT OFFICE

AYLMER H. MAUDE, OF NITRO, WEST VIRGINIA, ASSIGNOR TO THE RUBBER SERVICE LABORATORIES COMPANY, OF AKRON, OHIO, A CORPORATION OF OHIO

ALDEHYDE MANUFACTURE

No Drawing.     Application filed June 29, 1927. Serial No. 202,466.

The present invention relates to improvements in the manufacture of unsaturated aliphatic aldehydes from aldols by a catalytic dehydration process. More particularly the invention relates to the manufacture of crotonaldehyde from acetaldol by heating aldol in the manner as hereinafter set forth in the presence of aluminum phosphate and concentrated phosphoric acid.

Heretofore crotonaldehyde has been manufactured by the standard process which comprises the condensation of acetaldehyde to aldol and the decomposition of the latter into water and crotonaldehyde, as indicated by the following equation:

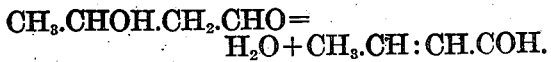

$$CH_3.CHOH.CH_2.CHO = H_2O + CH_3.CH:CH.COH.$$

The yields of crotonaldehyde by earlier known processes have, however, been relatively low and the product obtained has generally contained large proportions of impurities such as acetaldehyde, acids, acetals, crotonols and oily and tar like substances which were difficult to remove. I have now found that by heating acetaldol in the presence of concentrated phosphoric acid, the extent to which the undesired side reactions take place is effectually diminished and substantially prevented thereby making possible a transformation of a large proportion of the aldol into crotonaldehyde. The dehydration step is further aided by the presence of aluminum phosphate prepared in situ in the manner as hereinafter described. By employing the catalysts set forth, it has been found that exceptionally high yields of crotonaldehyde are realized. Moreover, the resulting aldehyde is of a high quality and can be obtained in a substantially anhydrous form by distillation means, preferably after treatment with some suitable water absorbent.

The following example is illustrative of one mode of carrying out the invention. An aldol was admixed with approximately 3% its weight of 85% phosphoric acid and 1% by weight of aluminum hydroxide and the mixture was heated in any suitable manner to approximately 160° C. and maintained thereat until the reaction products were substantially removed by distillation from the mixture and collected. Although other proportions of catalysts may be taken, it has been found desirable to employ those set forth in such ratio that at least half of the acid added remains in an uncombined condition during the entire process. Furthermore, it is desirable to form the aluminum phosphate in situ since the freshly prepared finely divided material has been found to be more efficient as a catalyst if prepared as described.

More specifically, the procedure has been carried out in accordance with the above process in which a mixture substantially in the proportion of 260 pounds of acetaldol, 6 pounds of concentrated phosphoric acid and 2 pounds of aluminum hydroxide were placed in a jacketed container equipped with a fractionating column and a water cooled condenser. Steam or other heating fluid was then flowed through the jacket of the container and the mixture was slowly heated to approximately 160° C. Any vapors that were evolved were removed from the container by passage through the fractionating column and condenser and were collected in a receiver. Acetaldehyde in small amounts was collected first while the larger fraction comprised a mixture of crotonaldehyde and water. This fraction was then purified by redistillation while employing a somewhat longer fractionating column than was necessary in the first step. In case a dry product is desired, this last distillation is carried out after treatment with some suitable anhydrous salt, or the redistilled crotonaldehyde can be dried by contacting it for a suitable period of time over anhydrous sodium sulphate or other non-reactive drying agents.

A yield of crotonaldehyde was thereby realized that corresponded to a transformation of more than 80% of the aldol into the aldehyde.

The above process has been found to operate very successfully and produce high yields of crotonaldehyde when the dehydration of the aldol is carried out in the presence of acetaldehyde. This gives an improved advantage to my present process since it renders unnecessary any treatment of aldol to remove acetaldehyde therefrom.

Thus a mixture of aldol and acetaldehyde consisting of approximately 278 parts of acetaldol and 122 parts of substantially anhydrous acetaldehyde was heated in the manner described in the previous example in the presence of approximately 10 parts of phosphoric acid and 3 parts of aluminum hydroxide. The fraction collecting up to about 30° C. and consisting for the most part of acetaldehyde, was employed for the preparation of a further quantity of aldol. Distillation was continued as before and the crotonaldehyde fraction collected was redistilled and dried. The yield of aldehyde so obtained was over 80% of the theoretical yield possible.

Although other proportions of the catalyst set forth have been employed it has been found that the highest yields of the desired product resulted from the use of the quantities indicated in the examples. Moreover, other catalysts may also be employed. Such catalysts, however, should preferably comprise a metallic hydroxide that is substantially insoluble in water and an excess of an acid capable of forming a salt of the hydroxide employed which salt also is substantially insoluble in water. Such salts to be most effective in the process should be produced preferably in the manner as set forth and not added in the form of a salt to the aldol, inasmuch as the fineness of division of the salt is apparently a material factor in the process.

The examples hereinbefore set forth are to be understood as illustrative only and not at all limitative of the scope of my invention. Furthermore, the invention is to be understood as not limited by any theories advanced in explanation of the changes involved in the process but is limited only by the claims attached hereto wherein I intend to claim all novelty in my process which is permissible in view of the prior art.

What I claim is:

1. The process of manufacturing an unsaturated aldehyde which comprises adding to an aldol a substantially water-insoluble metallic hydroxide, and a concentrated mineral acid, and heat-treating the mixture so obtained.

2. The process of manufacturing an unsaturated aldehyde which comprises adding to aldol aluminum hydroxide and concentrated phosphoric acid, and heat-treating the mixture so obtained.

3. The process of manufacturing an unsaturated aldehyde which comprises heating an aldol in the presence of aluminum phosphate and uncombined concentrated phosphoric acid.

4. The process of manufacturing an unsaturated aldehyde which comprises adding to an aldol approximately 1% its weight of aluminum hydroxide and approximately 3% its weight of 85% phosphoric acid, heating the resulting mixture to approximately 160° C. and collecting the heat distillation products.

5. The process of manufacturing crotonaldehyde which comprises adding to acetaldol approximately 1% its weight of aluminum hydroxide and approximately 3% its weight of 85% phosphoric acid, heating the resulting mixture to approximately 160° C. and collecting the heat distillation products.

6. The process of manufacturing crotonaldehyde which comprises adding to acetaldol approximately 1% its weight of aluminum hydroxide and more than an equivalent quantity of concentrated phosphoric acid to form aluminum phosphate in situ in the aldol, heating the mixture so formed and collecting the heat distillation products.

7. The process of manufacturing crotonaldehyde which comprises adding to acetaldol a substantially water-insoluble metallic hydroxide, and a concentrated mineral acid, and heat-treating the mixture so obtained.

8. The process of manufacturing crotonaldehyde which comprises adding to acetaldol aluminum hydroxide, and concentrated phosphoric acid, and heat-treating the mixture so obtained.

9. The process of manufacturing crotonaldehyde which comprises heating acetaldol in the presence of aluminum phosphate and uncombined concentrated phosphoric acid.

10. In the process of manufacturing crotonaldehyde from acetaldol, the step which comprises heat treating the aldol in the presence of a concentrated phosphoric acid.

11. In the process of manufacturing crotonaldehyde from acetaldol, the step which comprises heat treating the aldol in the presence of concentrated phosphoric acid with less than an equivalent amount of aluminum phosphate.

In testimony whereof I have affixed my signature.

AYLMER H. MAUDE.